United States Patent [19]
Fox et al.

[11] 3,788,427
[45] Jan. 29, 1974

[54] GREASE GUN AND COUPLING

[75] Inventors: Everett D. Fox, South Bend, Ind.;
John P. Schaefer, Edwardsburg, Mich.; Raymond M. Leliaert, South Bend, Ind.

[73] Assignee: Wheelabrator-Frye Inc., Mishawaka, Ind.

[22] Filed: June 9, 1972

[21] Appl. No.: 261,431

[52] U.S. Cl. ............ 184/105 C, 222/397, 251/112
[51] Int. Cl. .............................................. F16n 3/12
[58] Field of Search ........ 184/105 A, 105 C, 105 B; 222/397, 396, 389, 391, 256, 262; 251/107, 112, 114; 141/383, 387

[56] References Cited
UNITED STATES PATENTS

| | | | |
|---|---|---|---|
| 3,589,470 | 6/1971 | Dorn | 184/105 C |
| 3,219,279 | 11/1965 | Peeps | 251/112 X |
| 2,615,598 | 10/1952 | Watkins | 222/397 |
| 2,610,768 | 9/1952 | LeClair | 222/397 X |

FOREIGN PATENTS OR APPLICATIONS

| | | | |
|---|---|---|---|
| 963,836 | 7/1964 | Great Britain | 184/105 C |
| 571,181 | 12/1957 | Italy | 184/105 C |
| 984,886 | 3/1965 | Great Britain | 184/105 A |
| 1,124,313 | 2/1962 | Germany | 184/105 C |

*Primary Examiner*—Manuel A. Antonakas
*Attorney, Agent, or Firm*—Wood, Herron & Evans

[57] ABSTRACT

An improved high pressure grease gun and coupling unit for connecting the gun to a grease fitting. The coupling comprises a piston actuated collet type clamp which is normally spring biased to a position in which the collet is compressed. An axially movable valve element extends through the collet clamp and is engageable with the end of the grease fitting when the coupling is clamped onto a fitting. This valve is automatically opened by engagement with the fitting and is automatically closed by the pressure of the grease contained within the coupling when the coupling is removed from the fitting. The gun has a pressure relief valve and a pressure relief valve safety which prevents actuation of the gun whenever the relief valve is open.

20 Claims, 7 Drawing Figures

3,788,427
SHEET 1 OF 2
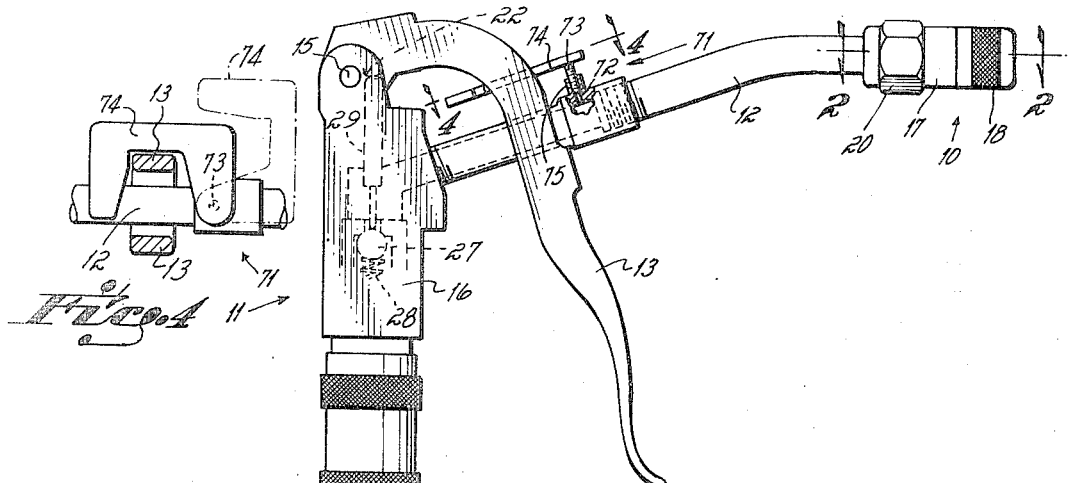
Fig. 1
Fig. 4
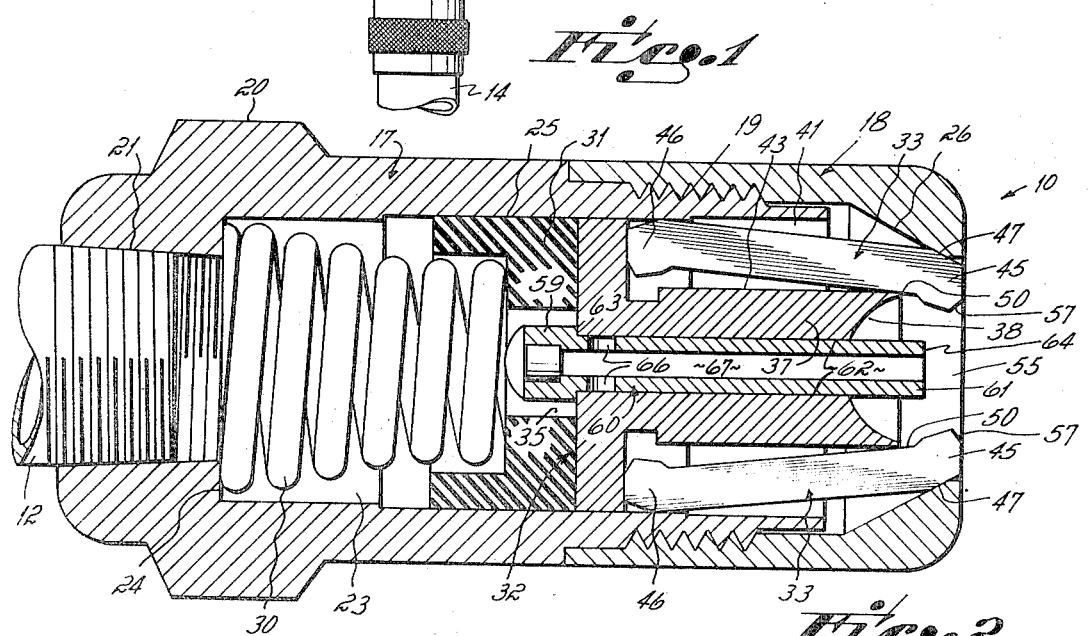
Fig. 2
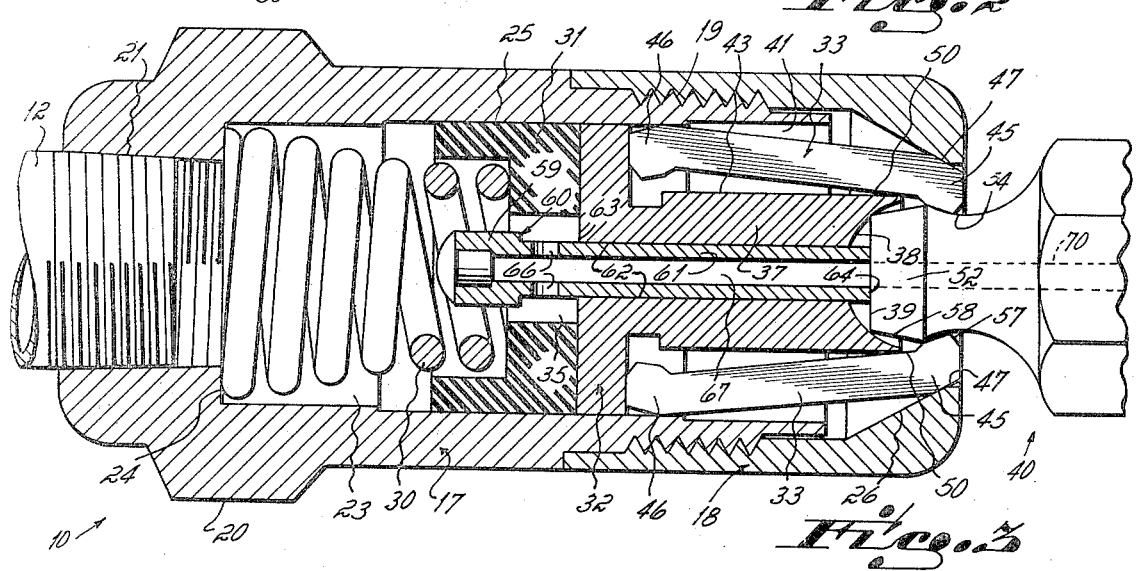
Fig. 3

GREASE GUN AND COUPLING

BACKGROUND OF THE INVENTION

This invention relates to grease guns and particularly to an improved coupling for securing the outlet end of the gun to a hydraulic grease fitting. The coupling has a valve contained internally of it which prevents grease from being ejected from the gun except when the coupling is properly located over a grease fitting.

Grease guns of the type with which the invention of this application is utilized are conventionally used in automobile service stations to grease bearings of motor vehicles. The gun is in reality a manually operated control handle for controlling a valve which in turn controls the flow of grease through the handle. When the valve of the gun or control handle is manually opened, it connects the outlet end of the gun to a high pressure grease pump. This pump is usually operable to supply grease to the gun at a pressure of approximately 7,000 pounds p.s.i. Grease is ejected from the gun at a pressure up to 7,000 pounds p.s.i., depending upon the resistance encountered by the grease in the bearing to which the grease is supplied. The greater the resistance, the higher the pressure of the grease ejected from the gun.

In addition to lubricant flow control handles of the type just described, there are also so-called "booster" control handles or guns for lubricating motor vehicles. Booster control handles are used for supplying grease at still higher pressures to vehicle bearings. A conventional booster control is operable to boost the ratio of grease pressure from the inlet to the outlet by a two-to-one ratio, i.e., from 7,000 to 14,000 p.s.i. Generally, booster control handles or guns are used to grease bearings of trucks or motor vehicles which are heavily loaded.

Irrespective of the type of gun or control handle which is employed for greasing or lubricating motor vehicles, some form of coupling unit is required between the gun and the grease fitting of the vehicle to interconnect the gun to the fitting. One aspect of the invention of this application is concerned with that coupling and particularly with a "fail safe" coupling which is operable to eliminate a common type of industrial accident.

Far too commonly garage mechanics incur blood poisoning and medical complications resulting from that poisoning while attempting to dispense a small quantity of grease from a high pressure gun into a rag or into their hand. This accident usually occurs when a mechanic attempts to obtain a small quantity of grease from the gun for application to a nonfitting equipped portion of a vehicle, as for example, the exterior of a control rod. Quite commonly unskilled operators simply hold the rag over the end of the gun and operate the control handle. Depending upon the distance of the operator's hand from the end of the gun, the resulting discharge of grease may contact the rag and hand at a pressure up to several thousand pounds p.s.i. All that is required to cause the grease to penetrate the skin is a pressure of from approximately 500—1,000 pounds p.s.i. Consequently, it is relatively common for garage mechanics to inject themselves with grease and even to squirt grease completely through their hand with existing commercial lubricating equipment. This accident, when it occurs, frequently results in blood poisoning of the operator and, in the worst instances, requires amputation of an operator's hand.

It has therefore been an objective of this invention to eliminate or minimize the possibility of a mechanic either deliberately or inadvertently injecting himself with grease discharged through a grease gun and connected coupling. To that end, the grease gun coupling of this invention comprises a collet type clamp in the coupling for securement to a hydraulic grease fitting and a fail safe valve extending through the collet clamp. This valve is maintained in a closed position by the pressure of the grease internally of the coupling. When the coupling, though, is forced over the end of a hydraulic grease fitting, the end of the valve plunger contacts the grease fitting and causes the valve to be opened. Consequently, the manual control handle cannot be actuated to discharge grease except when the coupling is safely located over and clamped onto a grease fitting.

Another object of this invention has been to provide a coupling which maintains the end of a grease fitting free of waste grease. To this end, the coupling includes a generally hemispherical recess at the outer end of a collet actuating piston. This recess serves to guide the end of a grease fitting into a central position in the collet and to seal the fitting so as to prevent grease from seeping out around the edge of the fitting. The valve plunger of the coupling extends through the hemispherical recess and forms a sealed direct flow path through the coupling into the fitting so that grease cannot enter the recess. Consequently, a small deposit of grease is not left on the outer end of the fitting when the coupling is removed from the fitting.

The coupling which accomplishes these objectives comprises a cylindrical housing through which there is an axial flow passage. One end of this housing is adapted to be connected to the discharge end of a control handle. The other end of the housing contains a piston actuated collet which is adapted to engage and snap over the end of a hydraulic grease fitting. The piston of the collet assembly is spring biased to a position in which the collet is maintained in a closed position but is movable axially to enable the collet to expand radially and slip over the end of the fitting. A hub extends axially from the piston and is engageable with the end of the fitting to effect axial movement of the piston and consequent radial movement of the collet clamping fingers. There is a normally closed valve contained within an axial passage of the piston and hub. This valve includes a plunger which is engageable with the end of the grease fitting to effect opening of the valve and fluid communication between the hydraulic grease fitting and the control handle. When the coupling is disconnected from the fitting, this valve is automatically closed by the pressure of the grease contained within the coupling.

The valve plunger of the coupling also serves to maintain the end of the grease fitting free of waste grease when the coupling is disconnected from it. Consequently, the valve serves the dual function of maintaining the end of the fitting clean and free of exposed grease while simultaneously rendering the gun "fail safe" so that an operator cannot either accidentally or intentionally discharge grease from it except when it is properly located over a grease fitting.

Very nearly all high pressure grease guns contain a pressure relief valve to enable the gun to be removed or disconnected from "frozen" or "no-flow" grease fittings. The necessity for this relief valve stems from the fact that most grease gun couplings include a piston actuated collet for clamping onto a grease fitting. If the fitting is frozen so that there is no flow through it, the collet becomes clamped onto the fitting by full grease pressure generally on the order of 7,000 pounds per square inch or more, acting on the collet. The coupling can then only be removed by relieving the grease pressure behind the piston and this is generally accomplished by opening the relief valve. If this relief valve is opened to too great an extent or if the gun is equipped with the valved coupling unit described hereinabove and the gun is activated while the coupling valve is closed and the relief valve open, high pressure grease is ejected through the relief valve and a dangerous condition obtains.

It has therefore been another objective of this invention to prevent ejection of grease through the relief valve. To this end the improved grease gun or control handle of this invention includes an interlock operative to prevent actuation of the gun when the relief valve is open. Consequently the gun is absolutely fail safe and grease cannot be ejected through the relief valve.

These and other objects and advantages of this invention will be more readily apparent from the following description of the drawings in which:

FIG. 1 is a side elevational view of a grease gun control handle upon which there is mounted a coupling incorporating the invention of this application.

FIG. 2 is a cross sectional view through the control handle coupling of FIG. 1 taken on line 2—2 of FIG. 1.

FIG. 3 is a view similar to FIG. 2 but illustrating the coupling connected to a hydraulic grease fitting.

FIG. 4 is a cross sectional view taken on line 4—4 of FIG. 1 illustrating the two positions of the relief valve control lever.

Figure 5:
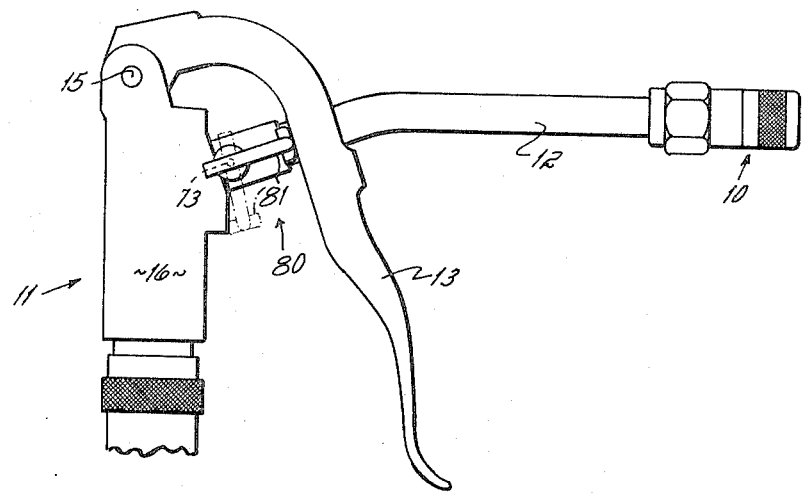
FIG. 5 is a side elevational view of a second modification of the grease gun control handle incorporating the invention of this application.

Referring first to FIG. 1, the grease coupling 10 of this invention is illustrated as secured to the discharge end of a high pressure grease gun control handle 11 and a handle extension tube 12. The handle 11 has a manual trigger 13 operated control valve for controlling the flow of grease from a high pressure hose 14 to and through the extension tube 12. The hose 14 is conventionally a double wire braided hose which interconnects the handle 11 to a source of grease or hydraulic lubricant through a high pressure pump (not illustrated). Conventionally, the pump is an air operated reciprocating piston pump which is operated by approximately 150 pounds air pressure and is operable to discharge grease or lubricant at a pressure on the order of 7,000 pounds p.s.i.

The valve mechanism contained within the handle 11 for controlling the flow of lubricant through the gun or handle comprises a ball 27 type valve which is normally urged by a spring 28 to a closed position. To open the valve and permit the throughput of high pressure grease from the hose 14, the trigger 13 actuates valve plunger 29 which is slideably mounted above the ball in the body of the handle 11. The trigger 13 is pivotally mounted on the top of the handle, as indicated at 15, and has a cam surface 22 engageable with the top of the plunger 29 so that movement of the trigger from the position illustrated in FIG. 1 toward the body of the handle causes the cam surface 22 and plunger 29 to be moved downwardly and open the ball valve 27. Upon release of the handle, the valve 27 is automatically closed by the spring 28.

In the embodiment illustrated in FIG. 1, there is a pressure relief valve 71 located in the extension tube 12 between the trigger 13 and the coupling 10. This relief valve functions to enable the coupling to be disconnected from a grease fitting if it becomes clamped to the fitting by high pressure grease entrapped in the extension tube 12 and coupling 10 as is explained more fully hereinafter.

The coupling 10 which is the subject of one aspect of this invention comprises a two-piece cylindrical housing having a rear section 17 and forward section 18. A hexagonal nut 20 is formed on the exterior of the rear section 17 so that it may be threaded onto the forward end of the extension tube 12. Preferably the interconnection between the coupling 10 and extension 12 is made by pipe threads formed on the exterior of the extension tube 12 and threaded onto a threaded section 21 of a bore 23 through the coupling.

The bore 23 extends axially completely through the assembled sections 17 and 18 of the housing. It is defined by a spring seat 24, a cylinder 25 and an inwardly tapered flange 26 at the front of the forward section 18 of the housing.

A collet type clamp is located within the cylinder 25 of the housing and is operable to secure the coupling 10 to a hydraulic grease fitting 40. It comprises a spring 30, a resilient seal 31, a piston 32, and a plurality of clamping fingers 33.

The spring 30 comprises a helical coil compression spring which normally biases the resilient washer 31 and piston 32 forwardly toward the open outer end of the coupling. The washer 31 functions as a seal for the piston 32. It is generally cup shaped and is maintained in engagement with the piston 32 by the spring 30. There is an axial aperture 35 through the center of the washer 31 which serves as a through passage for grease and lubricant.

The piston 32 is axially slideable within the cylinder 25 and has a central hub 37 extending forwardly from it. There is a hemispherical recess 38 in the forward end of the hub for reception of the top 39 of a hydraulic grease fitting 40, as is explained more fully hereinafter.

In the preferred embodiment of the invention, there are three clamping fingers 33 located within an annular recess 41 defined between the cylindrical bore 25 of the housing and the exterior surface 43 of the hub 37. Each of these fingers is arcuately contoured when viewed from the end so as to fit within the annular recess 41. It is curved or bent inwardly at its opposite ends as indicated at 45 and 46. These inwardly curved ends define a tapered end surface 47 which cooperates with the inwardly tapered end 26 of the housing so that the outer ends 45 of the clamping fingers are forced radially inwardly in the course of being moved forwardly. The extent to which the fingers may move inwardly is controlled and limited by engagement of the inside surface 50 of the fingers with the external surface 43 of the piston hub 37.

Diverging tapers 57 are formed on the outer ends of the collet fingers to facilitate movement of a fitting into the open end 55 of the coupling. These diverging tapers on the outer ends of the collet fingers are cooperable with the tapered ends 58 of a hydraulic grease fitting 40 to cause the fingers to move axially rearwardly and radially outwardly upon initial engagement of the fitting with the fingers. In the course of moving rearwardly, the fingers force the piston 32 rearwardly against the bias of the spring 30 until the fingers snap over the end 52 of the coupling. The fingers are then held in this position in which the coupling is clamped over the end of the fitting by the spring pressure 30 and by the pressure of grease contained within the cylindrical bore 23 when the control handle valve is opened.

In order to render the control handle 11 "fail safe" and prevent a mechanic from discharging high pressure grease or lubricant through the gun either intentionally or inadvertently when the gun is not connected to a hydraulic grease fitting 40, the coupling of this invention includes a valve 60. This valve comprises a headed plunger 61 slideable within an axial bore 62 of the piston 32 and hub 37. This plunger 61 has a shouldered head section 59 which cooperates with a seat 63 formed on the piston to prevent the flow through of grease except when the plunger is pushed rearwardly by engagement of the end 64 of the piston with the end surface 39 of the fitting. When the fitting is received within the collet fingers and the outer ends of the fingers are secured over the neck 54 of the fitting, the plunger is forced rearwardly against the bias of grease or lubricant contained within the chamber 23. When thus moved rearwardly, radial passages 66 of the plunger are uncovered so as to interconnect an axial passage 67 of the plunger 61 with the chamber 23 of the coupling. When the passages 67, 23 are in fluid communication, grease may flow from the extension tube 12 of the gun through the chamber 23, the axial aperture 35 of the resilient washer 31, and the passages 66, 67 of the valve plunger 61 into and through an axial passage 70 of the hydraulic grease fitting 40.

It is to be noted that because grease or lubricant must flow through the passage 67 of the valve plunger 61 in order to pass through the coupling, grease or lubricant is generally precluded from seeping past the end 64 of the plunger into the hemispherical recess 38 on the end of the hub. Consequently, the end surface 64 of the plunger maintains the end of the grease fitting clean and prevents a deposit of grease from being left on the end of the fitting each time it is coupled to the control handle.

In operation, the coupling is forced by axial pressure over the end of a hydraulic grease fitting until the collet fingers 33 snap onto the neck section of the fitting. Spring pressure 30 then maintains the collet fingers clamped over the fitting neck 54 while a valve (not shown) contained within the control handle 11 is opened by actuation of the handle 13. At that time high pressure lubricant or grease flows from the hose 14 through the handle 11, extension tube 12, and coupling 10 and through the valve 60 contained within the coupling into and through the fitting 40. So long as the trigger 13 is pulled rearwardly, high pressure grease contained within the chamber 23 of the coupling maintains the piston in its forward position and the collet fingers 33 securely clamped onto the neck of the fitting. When the trigger is released, though, and the valve of the control handle closed, the chamber 23 is disconnected from the high pressure grease so that the coupling may be pulled away from the fitting by forcing the clamping fingers 33 radially ourwardly and axially toward the opposite end or the rearward end of the coupling 10 against the bias of the spring 30. As the coupling is pulled away from the fitting, the end 64 of the valve is maintained in engagement with the end 39 of the fitting until the valve 60 is closed by location of the radial apertures 66 within the axial passage 62 of the piston. Only then does the end surface 64 of the plunger disengage the end of the fitting with the result that the end of the fitting is left free of grease or lubricant.

The primary advantage of the coupling described hereinabove resides in the inability of a mechanic to discharge grease into his hand either intentionally or inadvertently unless the coupling is secured onto the end of an Alemite fitting. Consequently, the control handle is much safer in the hands of an unskilled operator than it would be in the absence of the valve 60 contained within the coupling. Additionally, the provision of the valve within the coupling maintains the end of the grease fitting free of grease which in the absence of the valve must be wiped clean from the surface of the fitting if the fitting is to be maintained in a clean condition.

Because grease cannot be ejected through the coupling 10 unless it is secured over a grease fitting 40, it is possible for an operator to activate the trigger 13 and inadvertently fill the extension tube 12 and coupling 10 with high pressure grease. When this occurs, high pressure grease behind the piston 32 may prevent any rearward movement of the piston 32 and thereby absolutely preclude the coupling from subsequently being attached to a fitting 40. Alternatively, if the coupling is properly located over a fitting in the manner illustrated in FIG. 3 but the bearing being lubricated by the fitting 40 is frozen so that there is no throughput of grease, the grease pressure behind the piston 32 may prevent the collet from being removed from the fitting. In either of these two situations, the pressure of the grease in the extension tube 12 must be relieved and to that end the relief valve 71 is located in the extension tube 12. This relief valve comprises a valve seat 72 in communication with the interior of the tube 12 and a needle valve 73 engageable with the seat to maintain it in a closed position. The threads of this needle valve are so configurated that after 90° of rotation of the needle valve 73 the interior of the extension tube 12 will be open to atmosphere through the valve seat 72 and the clearance between the threads of the needle valve and the bleeder body 75.

When assembled, the needle valve screw is only rotatable through 90° from the position illustrated in phantom in FIG. 4 in which the relief valve 71 is closed to the position shown in full lines in FIG. 4 in which the relief valve is open. In the open position of the relief valve, a lever 74 attached to the needle valve 73 surrounds the trigger 13 and precludes its movement. Consequently, the trigger cannot be actuated to open the ball valve 27 contained within the body 16 so long as the relief valve is open. Before the trigger can be moved at all, the relief valve 71 must be closed by moving the lever 74 to the phantom position of FIG. 4 in which the relief valve is closed.

The advantage of providing the lever 74 on the relief valve and constructing the relief valve so that it is only movable through 90° between open and closed position is that it absolutely precludes high pressure grease from being ejected through the relief valve. In the absence of the lever 74, it would be possible to have an industrial accident as a result of the relief valve 71 being opened and the coupling valve 60 being closed when the trigger is pulled to open the flow control ball valve 27.

Referring now to FIG. 5, there is illustrated a second preferred embodiment of the gun or grease flow control handle 11 and coupling 10. In this embodiment all of the components which are identical to the corresponding components of FIGS. 1–3 have been given identical numerals. In fact, all of the components are identical except for the relief valve 80. In this embodiment the pressure relief valve 80, rather than being located outboard of the trigger or between the trigger and coupling, as illustrated in FIG. 1, is located between the trigger 13 and handle body 16. Except for their location, the needle valve 73 and valve seat 72, as well as the bleeder body 75, are identical to the correspondingly numbered relief valve components of FIG. 1. Another difference is in the configuration of the trigger blocking lever 81. In this modification the lever is a generally T-shaped bar fixedly secured to the end of the needle valve 73. This bar is movable from a trigger blocking position, illustrated in solid lines in FIG. 5, to a downwardly extending nonblocking position illustrated in phantom lines in FIG. 5. In the solid line trigger blocking position of the lever, the relief valve is open and so connects the interior of the extension tube to atmosphere. In the phantom line position of the lever (FIG. 5), the relief valve is closed. Consequently, the trigger 13 cannot be moved to open the flow control valve except when the relief valve is closed.

Figure 6:
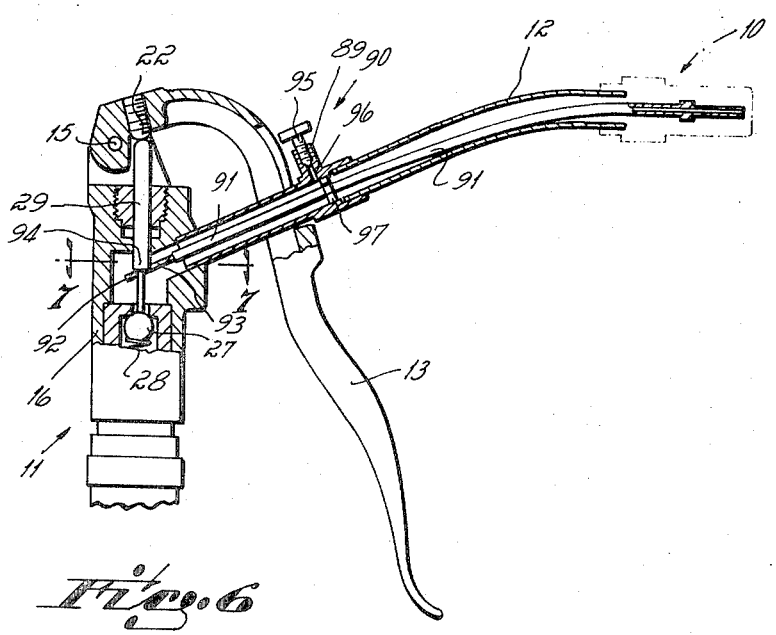
FIG. 6 is a side elevational view, partially in cross section of a third modification of grease gun control handle incorporating the invention of this application.
Figure 7:
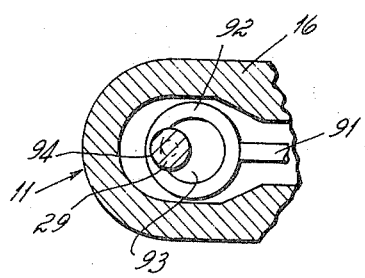
FIG. 7 is a cross sectional view taken on line 7—7 of FIG. 6.

Referring now to FIG. 6, there is illustrated still a third preferred embodiment of the grease gun flow control handle and grease fitting coupling of this application. In this modification, as in the modification of FIG. 2, those components of the coupling and of the gun which are identical to corresponding components illustrated in the embodiment of FIGS. 1–3 have been given identical numerals.

The primary difference between the gun handle 11 and coupling 10 of the modification illustrated in FIG. 6 from the modification illustrated in FIGS. 1–3 is that the trigger 13 is automatically mechanically locked against movement whenever the coupling is disconnected from a grease fitting 40 and the relief valve 90 is automatically opened when the coupling is disconnected from the fitting. In this embodiment, though, the relief valve 90 is automatically closed when the coupling is fitted over the end of a grease fitting and the handle 13 is automatically freed for movement at this time. To accomplish this automatic interlock of the trigger 13 and coupling valve 60, a linkage is provided in the form of a hollow tube 91 which extends between the piston head 59 back through the extension tube 12 and into the body 16 of the handle. At its inner end within the body 16, the tube terminates in a flat circular washer 92. The open center 93 of the washer normally surrounds the valve plunger 29. In this modification of the gun, the valve plunger 29 is provided with a shoulder or recessed slot 94 with which the washer is engageable to prevent axial downward movement of the plunger when the coupling valve 60 is in an extended position. The washer 92 thus prevents axial movement of the valve rod and consequently valve opening movement of the trigger 13 until the connecting tube 91 is moved rearwardly by engagement of the end surface 64 of the valve 60 with a grease fitting.

When the collet clamp of the coupling is properly connected to a fitting 40, the end 64 of the valve 60 is caused by the fitting to move rearwardly, thereby effecting movement of the tube 91 and the attached washer 92 to a noninterfering position relative to the plunger 29. In this position of the washer 92, the plunger 29 may be moved axially downwardly by the rearward movement of the trigger 13.

To effect automatic opening and closing of the relief valve 90 in this modification of the gun, the needle valve 95 is set so that the opening 96 of the bleeder body 89 is always open to atmosphere. To close the opening 96, there is a spider 97 fixedly secured to the tube 91 and movable between a first position in which the spider blocks the port 96 (when the coupling valve 60 is open) and a second position (illustrated in FIG. 6) in which the spider is out of blocking engagement with the aperture 96. In this nonblocking position of the spider, the interior of the tube 12 is open to atmosphere through recesses (not shown) spaced around the spider 97 and through the aperture 96 and needle valve 95.

It will readily be appreciated that in this third embodiment of the gun the flow control ball valve 27 is automatically locked against opening movement whenever the coupling 10 is disconnected from a grease fitting 40 and at the same time the relief valve 90 is automatically connected to the interior of the tube. When the coupling 10 is properly fitted over the end of a hydraulic or grease fitting 40, the relief valve 90 is automatically closed and the flow control ball valve 27 is automatically released for opening movement upon actuation of the trigger 13.

While we have described only three preferred embodiments of our invention, persons skilled in the arts to which this invention pertains will readily appreciate modifications and changes which may be made without departing from the spirit of our invention. Therefore, we do not intend to be limited except by the scope of the appended claims.

Having described our invention, we claim:

1. A lubricant flow control handle for supplying grease to a grease fitting, said handle comprising
   a handle body adapted to be connected at one end to a high pressure hose,
   a handle extension connected at one end to the opposite end of said body,
   a hydraulic coupling connected to the opposite end of said extension,
   a flow control valve located interiorly of said body and operable to control the flow of grease through said body and into said coupling,
   a manually operable trigger pivotally mounted upon said body for controlling opening and closing of said flow control valve,
   pressure relief valve means operable to relieve grease pressure in the flow path between said flow control valve and said hydraulic coupling, and
   interlock means for preventing actuation of said trigger when said relief valve is in an open position.

2. The flow control handle of claim 1 in which said interlock means comprises a lock element fixedly secured to a portion of said relief valve and movable into a trigger blocking position when said relief valve is open.

3. The flow control handle of claim 1 in which said relief valve comprises a valve seat communicating with a flow path through said body and extension, and a rotatable threaded element movable into blocking engagement with said seat, said interlock means comprising a lock element secured to said rotatable threaded element and movable into a trigger blocking position when said relief valve is open.

4. The flow control handle of claim 1 in which the interlock means includes a coupling valve contained within said hydraulic coupling, a lock engageable with a portion of said flow control valve and means interconnecting said coupling valve and said lock so that said lock is disengaged from said flow control valve when said coupling valve is open and is engaged with said flow control valve and operative to prevent opening of said flow control valve when said coupling valve is closed.

5. The flow control handle of claim 4 in which said relief valve is automatically opened in response to closing of said coupling valve and is automatically closed in response to opening of said coupling valve.

6. The flow control handle of claim 1 in which said hydraulic coupling is operable to connect said handle to a grease fitting, said coupling comprising a generally cylindrical housing having an axial bore extending through said housing, collet type coupling means at the outer end of said housing, a piston axially slideable within said bore, said piston being operable to urge said collet type coupling means to a closed position, a spring located within said cylinder and operable to urge said piston forwardly toward said outer end of said housing, an axial flow passage through said piston, and valve means contained within said axial flow passage for controlling the flow of grease through said coupling, said valve means including a valve plunger engageable with the end of a fitting to open said valve when said collet type coupling means is located over the end of said fitting.

7. The flow control handle of claim 6 in which said valve means of said coupling comprises a valve seat in said piston and a valve head on said plunger engageable with said seat to close said valve, said plunger having an axial passage for the flow of grease through said plunger and a radial bore in one of said valve head or plunger in fluid communication with said axial passage of said plunger.

8. The flow control handle of claim 6 in which said piston has a forwardly extended hub section, said hub section terminating in a generally hemispherical recess at its forwardmost end, said recess being engageable with the end of a grease fitting.

9. The grease coupling of claim 6 in which said valve means of said coupling comprises a valve seat in said piston and a valve head on said plunger engageable with said seat to close said valve, said plunger having an axial passage for the flow of grease through said plunger and a radial bore in one of said valve head or plunger in fluid communication with said axial passage of said plunger.

10. The grease coupling of claim 9 in which said piston has a hub section, said hub section terminating in a generally hemispherical recess at its forwardmost end, said recess being engageable with the end of a grease fitting.

11. The lubricant flow control handle of claim 1 in which said hydraulic coupling comprises a generally cylindrical housing having an axial bore extending through said housing, connector means at one end of said housing for connecting said housing to said gun with said axial bore in fluid communication with a through passage of said gun, collet type coupling means at the other end of said housing, said collet type coupling means comprising an inwardly tapered surface in said bore and a plurality of axially and radially movable clamping fingers engageable with said tapered surface, a piston axially slideable within said bore and having a hub extending forwardly from said piston toward said other end of said housing, said hub being engageable with said clamping fingers to limit radial inward movement of said fingers, a spring located within said cylinder and operable to urge said piston forwardly toward said other end of said housing, an axial flow passage through said piston and said hub, and coupling valve means contained within said axial flow passage for controlling the flow of grease through said coupling, said coupling valve means including a valve plunger engageable with the end of a grease fitting to open said coupling valve means when said collet fingers are located over the end of said grease fitting.

12. The handle of claim 11 in which said coupling means comprises a valve seat in said piston and a valve head on said plunger engageable with said seat to close said valve, said plunger having an axial passage for the flow of grease through said plunger and a radial bore in one of said valve head or plunger in fluid communication with said axial passage of said plunger.

13. The handle of claim 11 in which said hub has a generally hemispherical recess in its forwardmost end, said recess being engageable with the end of a grease fitting.

14. The handle of claim 11 in which said connector means comprises a threaded bore for reception of a threaded outlet on said gun.

15. The handle of claim 14 in which said coupling means comprises a valve seat in said piston and a valve head on said plunger engageable with said seat to close said valve, said plunger having an axial passage for the flow of grease through said plunger and a radial bore in one of said valve head or plunger in fluid communication with said axial passage of said plunger.

16. The handle of claim 15 in which said hub has a generally hemispherical recess in its forwardmost end, said recess being engageable with the end of a grease fitting.

17. A flow control handle for supplying lubricant to a grease fitting, said handle comprising a handle body adapted to be connected at one end to a high pressure hose, a handle extension connected at one end to the opposite end of said body, a hydraulic coupling connected to the opposite end of said extension tube, a coupling valve located interiorly of said coupling, a flow control valve located interiorly of said body and operable to control the flow of grease through said body and into said coupling, a manually operable trigger pivoting mounted upon said body for controlling opening and closing of said flow control valve, pressure relief valve means operable to relieve lubricant pressure in the flow path between said flow control valve and said coupling, and interlock means operative to lock said flow control valve against opening when said coupling valve is closed.

18. The flow control handle of claim 17 in which said interlock means is operable to automatically unlock said flow control valve when said coupling valve is opened.

19. The flow control handle of claim 17 in which said interlock means is operable to open said relief valve in response to closing of said coupling valve.

20. The flow control handle of claim 17 in which said hydraulic coupling is operable to connect said handle to a grease fitting, said coupling comprising a generally cylindrical housing having an axial bore extending through said housing, collet type connecting means at the outer end of said housing, a piston axially slideable within said bore, said piston being operable to urge said collet type connecting means to a closed position, a spring located within said cylinder and operable to urge said piston forwardly toward said outer end of said housing, an axial flow passage through said piston, and said coupling valve means being contained within said axial flow passage for controlling the flow of grease through said coupling, said coupling valve means including a valve plunger engageable with the end of a fitting to open said valve when said collet is located over the end of said fitting.

* * * * *